US007757579B2

(12) United States Patent
Bloch

(10) Patent No.: US 7,757,579 B2
(45) Date of Patent: Jul. 20, 2010

(54) JOYSTICK DEVICE WITH REDUNDANT SENSOR PROCESSING

(75) Inventor: Jesper O. Bloch, Nordborg (DK)

(73) Assignee: Sauer-Danfoss Inc., Ames, IA (US)

( * ) Notice: Subject to any disclaimer, the term of this patent is extended or adjusted under 35 U.S.C. 154(b) by 1095 days.

(21) Appl. No.: 11/160,892

(22) Filed: Jul. 14, 2005

(65) Prior Publication Data

US 2006/0044269 A1 Mar. 2, 2006

Related U.S. Application Data

(60) Provisional application No. 60/605,466, filed on Aug. 30, 2004.

(51) Int. Cl.
*G05G 9/047* (2006.01)
*G06F 3/033* (2006.01)

(52) U.S. Cl. .................................. 74/471 XY; 345/161

(58) Field of Classification Search ............ 74/471 XY; 345/161; 463/36, 38; 273/148 B
See application file for complete search history.

(56) References Cited

U.S. PATENT DOCUMENTS

| | | | | |
|---|---|---|---|---|
| 3,331,972 | A | | 7/1967 | Moller |
| 3,609,611 | A | | 9/1971 | Parnell |
| 4,325,050 | A | | 4/1982 | Susynski |
| 4,459,578 | A | | 7/1984 | Sava et al. |
| 4,465,975 | A | | 8/1984 | Porter |
| 4,489,303 | A | | 12/1984 | Martin |
| 4,490,710 | A | | 12/1984 | Kopsho, Jr. et al. |
| 4,520,242 | A | | 5/1985 | Kopsho, Jr. |
| 4,533,827 | A | | 8/1985 | Fincher |
| 4,578,663 | A | | 3/1986 | Sanders et al. |
| 4,584,577 | A | | 4/1986 | Temple |
| 4,661,773 | A | | 4/1987 | Kawakita et al. |
| 4,782,293 | A | | 11/1988 | Steingroever et al. |
| 4,825,157 | A | | 4/1989 | Mikan |
| 4,853,630 | A | | 8/1989 | Houston |
| 4,972,284 | A | | 11/1990 | Smith et al. |
| 4,987,508 | A | | 1/1991 | Smith |
| 4,994,742 | A | | 2/1991 | Lowther |
| 5,055,812 | A | | 10/1991 | Abele et al. |
| 5,160,918 | A | * | 11/1992 | Saposnik et al. ............ 345/161 |
| 5,168,221 | A | | 12/1992 | Houston |
| 5,266,917 | A | | 11/1993 | Bleeke et al. |
| 5,293,900 | A | * | 3/1994 | Karbassi et al. ............. 137/554 |
| 5,307,776 | A | * | 5/1994 | Unuvar et al. ............... 123/399 |
| 5,399,967 | A | | 3/1995 | Carcadden |
| 5,416,457 | A | | 5/1995 | Nakatsuka et al. |
| 5,421,694 | A | | 6/1995 | Baker et al. |
| 5,503,040 | A | * | 4/1996 | Wright .................. 74/471 XY |
| 5,567,746 | A | | 10/1996 | Gay |
| 5,680,409 | A | * | 10/1997 | Qin et al. .................... 714/799 |

(Continued)

FOREIGN PATENT DOCUMENTS

DE 195 03 615 A1 2/1995

(Continued)

*Primary Examiner*—Thomas R Hannon
*Assistant Examiner*—Phillip A Johnson

(57) ABSTRACT

A joystick device having a grip assembly pivotably connected to a base assembly. The base assembly having sensing elements that detect the movement of the grip assembly as it pivots about the base assembly. Disposed within the base assembly and the sensing elements is a microprocessor. The microprocessor verifies an output signal prior to transmitting to a remote controller.

12 Claims, 7 Drawing Sheets

U.S. PATENT DOCUMENTS

| | | | | |
|---|---|---|---|---|
| 5,757,100 | A | 5/1998 | Burbacher | |
| 5,831,554 | A * | 11/1998 | Hedayat et al. | 341/20 |
| 5,850,142 | A | 12/1998 | Rountos et al. | |
| 5,889,507 | A * | 3/1999 | Engle et al. | 345/161 |
| 5,969,520 | A | 10/1999 | Schottler | |
| 6,116,844 | A * | 9/2000 | Hayward | 414/680 |
| 6,223,104 | B1 * | 4/2001 | Kamen et al. | 701/1 |
| 6,315,062 | B1 * | 11/2001 | Alft et al. | 175/45 |
| 6,421,593 | B1 * | 7/2002 | Kempen et al. | 701/48 |
| 6,486,626 | B1 * | 11/2002 | Pugh | 318/139 |
| 6,538,400 | B2 * | 3/2003 | Fowler et al. | 318/34 |
| 6,550,562 | B2 | 4/2003 | Brandt et al. | |
| 6,724,184 | B1 | 4/2004 | Marx et al. | |
| 6,863,144 | B2 * | 3/2005 | Brandt et al. | 180/333 |
| 6,882,917 | B2 * | 4/2005 | Pillar et al. | 701/48 |
| 6,904,823 | B2 * | 6/2005 | Levin et al. | 74/471 XY |
| 7,024,296 | B2 * | 4/2006 | Squires et al. | 701/48 |
| 7,200,469 | B2 * | 4/2007 | Katrak et al. | 701/1 |
| 7,275,607 | B2 * | 10/2007 | Kamen et al. | 180/7.1 |
| 2002/0097223 | A1 * | 7/2002 | Rosenberg | 345/157 |
| 2003/0107366 | A1 | 6/2003 | Busch et al. | |
| 2005/0068295 | A1 * | 3/2005 | Schottler et al. | 345/161 |
| 2005/0216134 | A1 * | 9/2005 | Katrak et al. | 701/1 |
| 2005/0228546 | A1 * | 10/2005 | Naik et al. | 701/1 |
| 2006/0058929 | A1 * | 3/2006 | Fossen et al. | 701/21 |
| 2008/0088397 | A1 * | 4/2008 | Kretschmer | 335/205 |

FOREIGN PATENT DOCUMENTS

| | | |
|---|---|---|
| EP | 0 501 906 A1 | 2/1992 |
| JP | 56-168504 | 12/1981 |
| JP | 58-066381 | 4/1983 |
| JP | 57-47792 | 10/1983 |

* cited by examiner

JOYSTICK DEVICE WITH REDUNDANT SENSOR PROCESSING

CROSS REFERENCE TO RELATED APPLICATION

This application claims the benefit of U.S. Provisional Application No. 60/605,466, filed Aug. 30, 2004.

BACKGROUND OF THE INVENTION

The present invention relates to control devices and, more specifically, joystick devices for controlling heavy machinery.

It is not uncommon for a piece of heavy machinery to be controlled by a joystick device. In such an arrangement, an operator grasps the joystick device and uses the device to steer the machine or perform other functions. Additionally, the joystick device may contain input buttons that allow the operator to control other functions of the machine. For example, in a lift truck, the joystick device may contain input buttons to allow the operator to control the movement and positioning of the lift arms.

The disadvantage of these joystick devices is that they require a plurality of electrical connections. Each of the input sources, including any input buttons and the grip itself, require electrical connections. Typically, each input requires power and ground connections to supply power as well as a data connection for sending an output signal to a remotely located main controller. As a result, conventional joystick devices typically employ many wires and cables, which tend to be bulky and compromise space.

U.S. Pat. No. 6,550,562 to Brandt et al. discloses a joystick controller that pivots from side to side and from front to back. In addition, the Brandt et al. device has a plurality of input buttons that control other functions of the vehicle, such as the turn signals, horn, and specific movements of the lift arms. All of these input buttons are electronically connected to a microprocessor disposed within the grip. The microprocessor combines all of these inputs and sends a single serial communication signal to a remotely located main controller that controls and drives the lift truck or other heavy machinery.

As described above there are many types of manufactured joysticks. Of current joystick devices, some utilizes two hall effect sensors per axis to create redundant sensing. However, to date the information from these redundant sensors is processed remotely from the joystick itself. This remote processing is disadvantageous where the electronic device is susceptible to failures. In the case of failure the device can either send out a signal that indicates an error or it can send out a false or bad signal that is within the normal expected operating range. This second type of signal presents a problem to the system in which the electronic device is being used because the system cannot distinguish if the signal is actually being commanded by the system or if it is a false signal. In the case of an electronic joystick used in conjunction with a remotely located micro controller and a vehicle as part of a system, the consequences of this type of failure (when the joystick fails and sends out a false or bad signal that is within the operating range, but is not the signal that is being commanded) result in an unsafe condition. Thus there exists a need in the art for a joystick that prevents this type of failure which creates unsafe conditions.

It is therefore a principal object of this invention to provide a joystick device that uses redundant sensors and an onboard microprocessor to determine if a failure of the device has occurred.

A further object of this invention is to provide a joystick device that has the ability to safely discontinue the joystick's function.

Another object of this invention is to provide a joystick device that has the ability to continue to operate the joystick and send out an error message to indicate that the signal is no longer verifiable.

These and other objects will be apparent to those skilled in the art.

SUMMARY OF THE INVENTION

A joystick device having a grip assembly pivotably connected to a base assembly. The base assembly having sensing elements that detect the movement of the grip assembly as it pivots about the base assembly. Disposed within the base assembly and the sensing elements is a microprocessor. The microprocessor verifies an output signal prior to transmitting to a remote controller.

DETAILED DESCRIPTION OF THE PREFERRED EMBODIMENT

Figure 1:
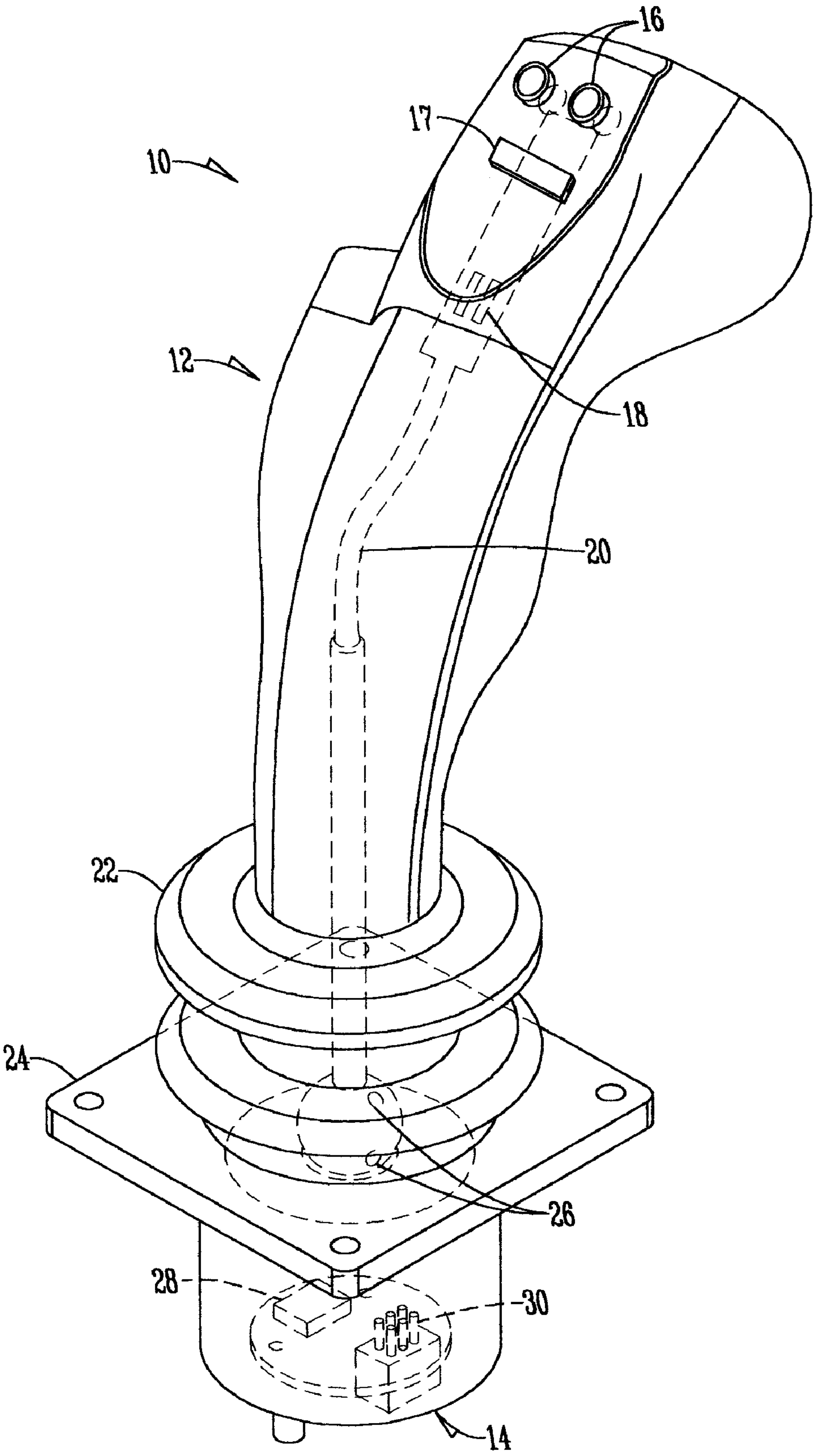
FIG. 1 is a perspective view of the joystick device of the present invention.
Figure 2:
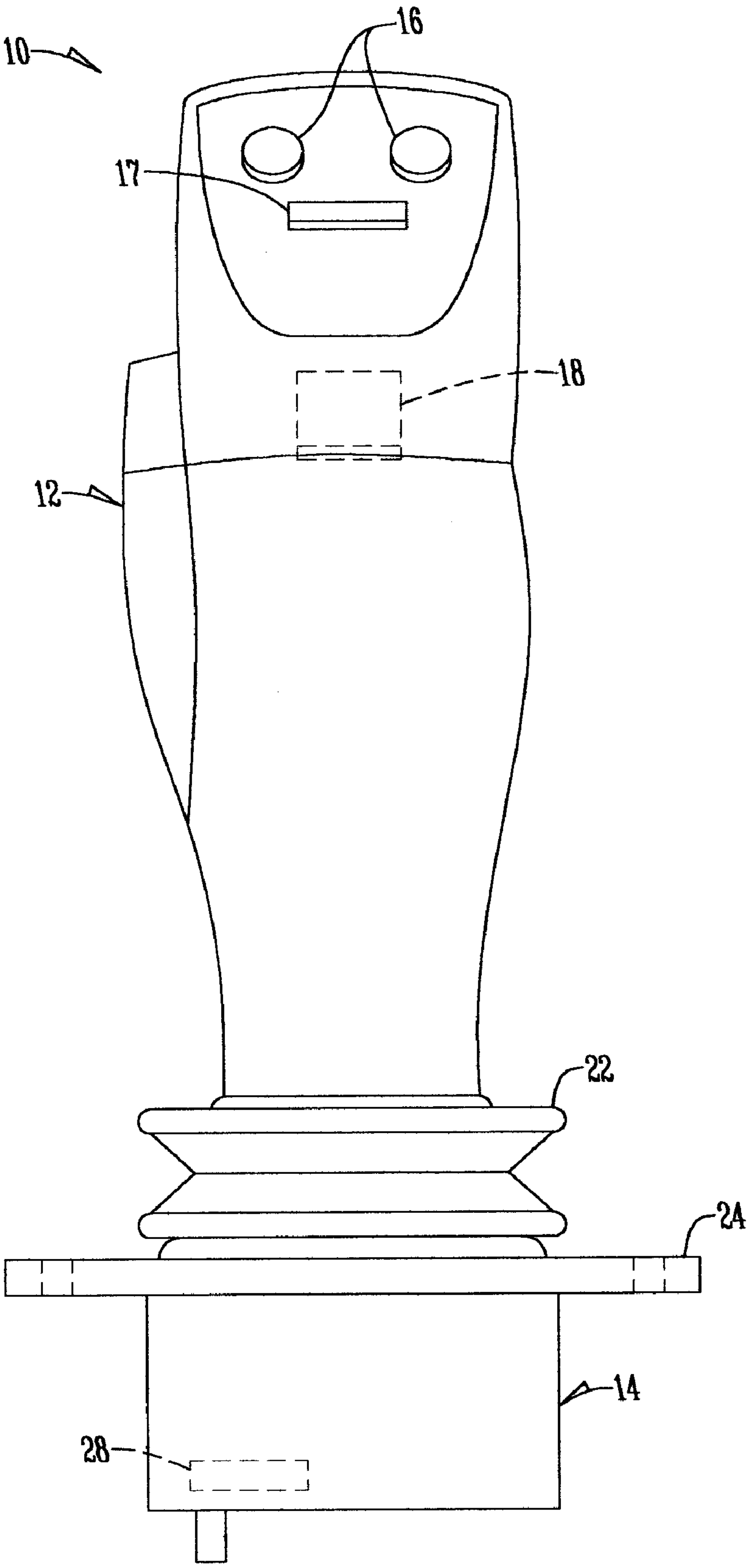
FIG. 2 is a front view of the joystick device of FIG. 1.
Figure 3:
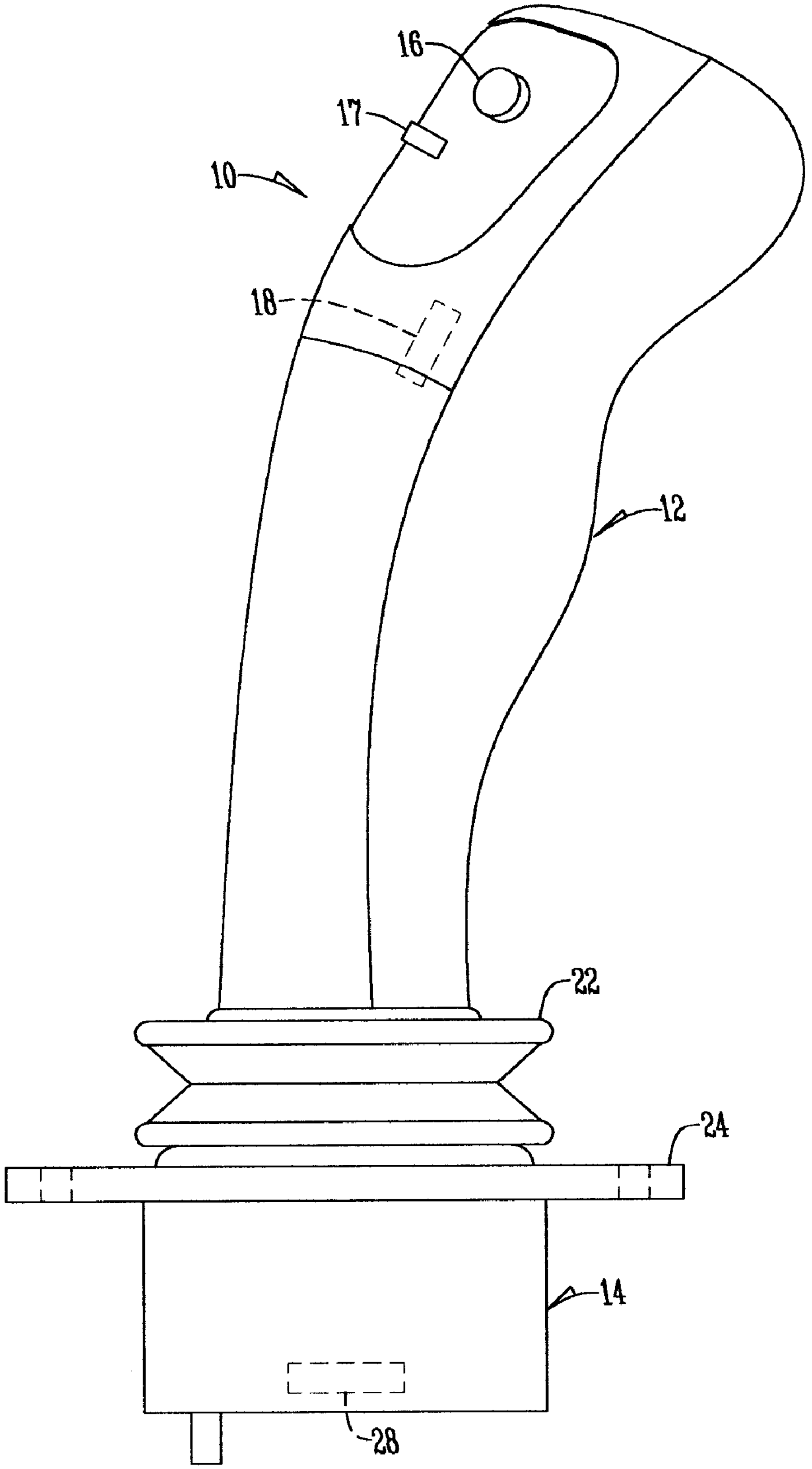
FIG. 3 is a side view of the joystick device of FIG. 1.
Figure 4:
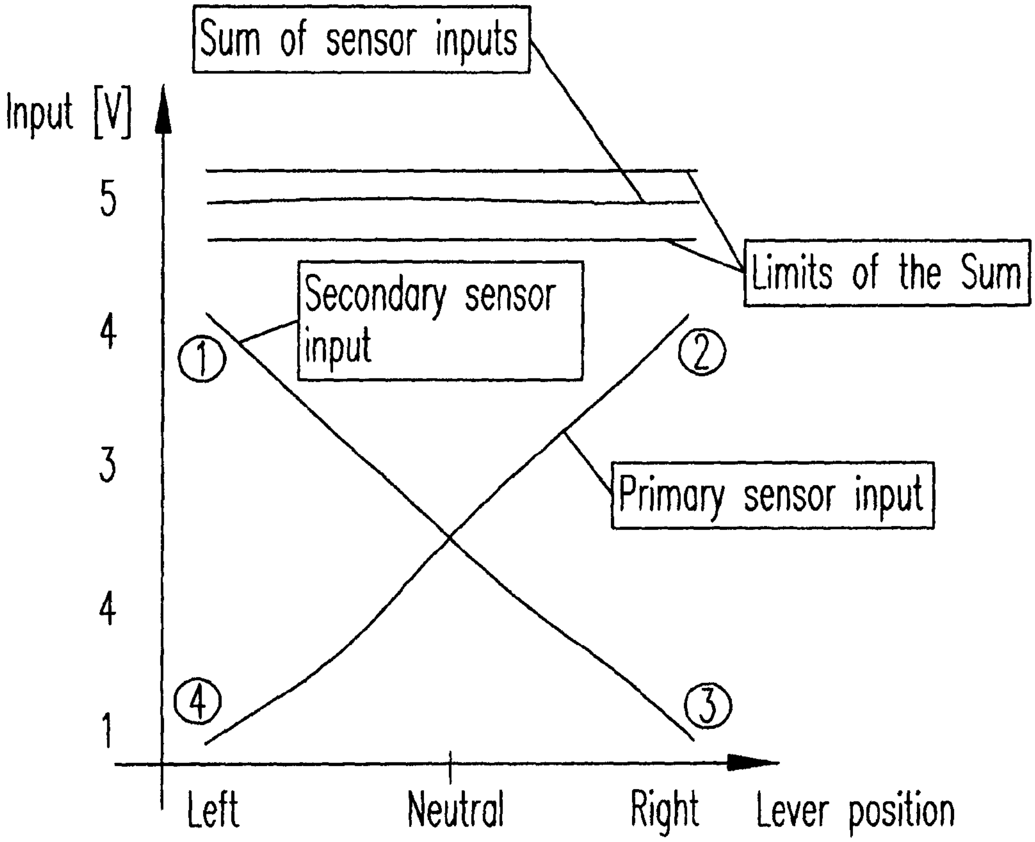
FIG. 4 is a graph of input voltage v. lever position
Figure 5:
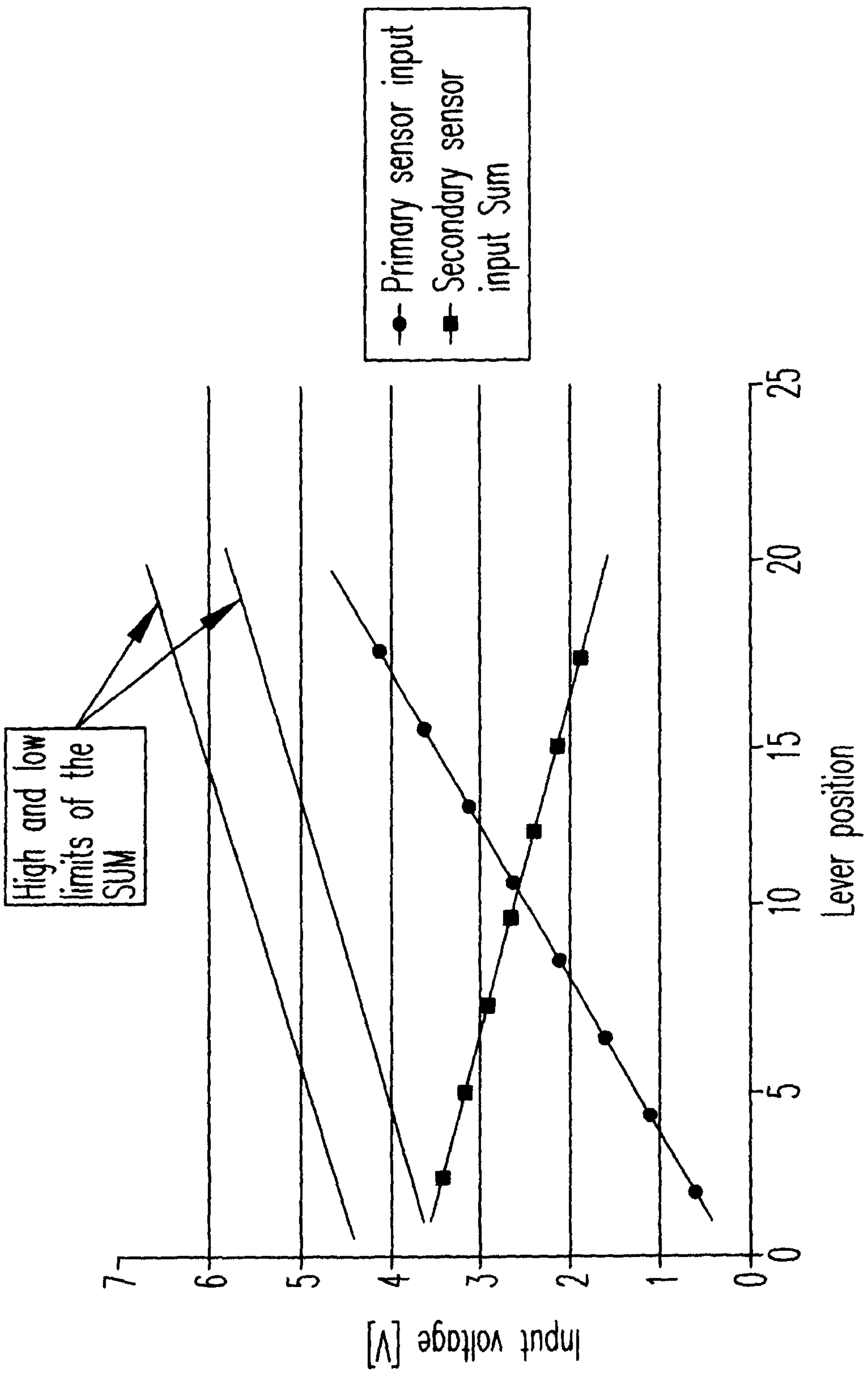
FIG. 5 is a graph of input voltage v. lever position.
Figure 6:
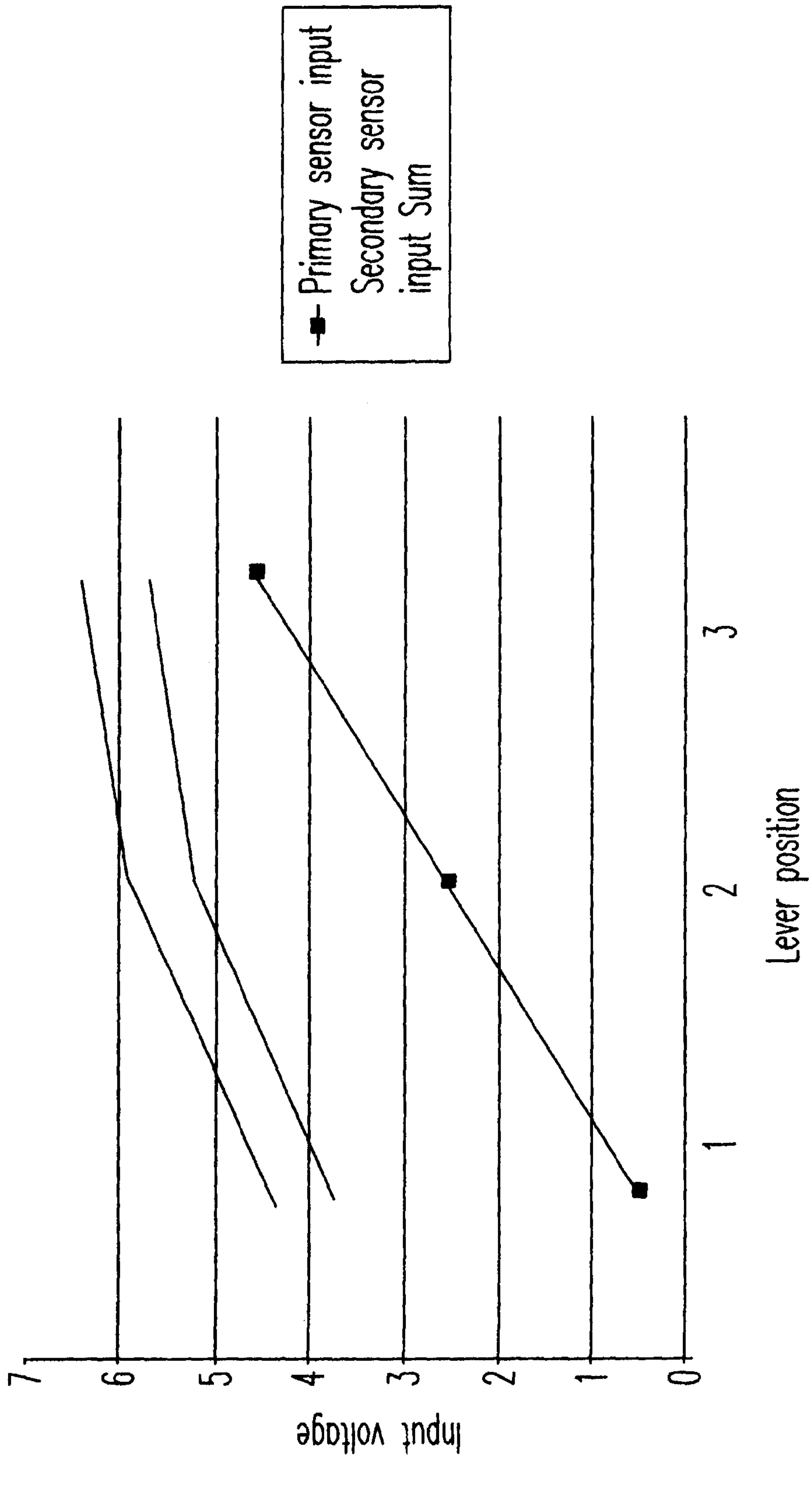
FIG. 6 is a graph of input voltage v. lever position.

With reference to FIGS. 1-3, a joystick device 10 is disclosed and includes a grip assembly 12 that is pivotally connected to a base assembly 14. The grip assembly 12 has a shape that accommodates an operator's hand according to the specific application.

The grip assembly 12 includes one or more input buttons 16 for use in controlling specific functions. The input buttons 16 are preferably digital inputs. Alternatively, the input may be proportional or analog inputs 17.

A microprocessor 18 is disposed within the grip assembly 12. The microprocessor 18 is in electronic communication with input buttons 16 and interconnect device 20. The microprocessor 18 receives signals from the input buttons 16 and outputs a single serial communication stream to the interconnect device 20. The serial communication stream is of a standard architecture, such as RS232 or CAN, but may include any custom designed scheme.

The grip assembly 12 is pivotally connected to the base assembly 14 via a flexible portion 22. The flexible portion 22 allows the grip assembly 12 to pivot front to back and side to side with respect to the base assembly 14.

The base assembly 14 includes a mounting plate 24 which permits the joystick device 10 to be secured to any location desired by the operator.

Sensing elements 26 are disposed within the base assembly 14. Sensing elements 26 detect movement of the grip assembly 12 as it pivots about the base assembly 14.

A microprocessor 28 is disposed within the base assembly 14. The microprocessor 28 is in electronic communication with the grip microprocessor 18 via the interconnect device 20, the sensing elements 26, and a remotely located main controller (not shown). The microprocessor 28 transmits a single serial communication stream to the remotely located main controller, which is used to drive control actuators (not shown) and other devices that control the function of the heavy machinery. The serial communication stream is of a standard architecture, such as RS232 or CAN, but may include any custom designed scheme.

An external interconnect device 30 is located on the base assembly 14 and is in electronic communication with the base microprocessor 28 and the remotely located main controller. Specifically, a cable (not shown) engages with the external interconnect device 30 and connects the joystick device 10 to the remotely located main controller.

The plurality of microprocessors are in electrical communication with all of the input buttons and sensing elements, to permit a single serial communication stream to be transferred from the joystick device to the remotely located main controller.

Preferably, two Hall effect sensors 26 are used for a given axis of rotation. Each sensor 26 is located in close proximity to a magnet. The sensors 26 measure the change in the magnetic field as the joystick 10 is pivoted around its center. One sensor measures the change in the magnetic field about a particular axis. The other measures the change in the magnetic field about the same axis, 180 degrees from the first.

By the nature of the geometry of the magnetic field, the output of the two sensors is opposite. If the first Hall effect sensor measures a change in the field that yields an increasing output, then the second sensor will measure a change in the field that yields a decreasing output. For example, it is typical that when used in a joystick the output from the sensor is set to 50% of the supply voltage or 2.5 volts for a 5 volt supply. The Hall effect sensors output will increase, proportionally, as the joystick 10 is rotated about the axis on which the sensor is positioned. So as the joystick 10 is rotated clockwise the output from the sensor would increase from 50% of the supply voltage to 51% to 52% and up to 100% of the supply voltage (depending on the settings applied to the sensor and the amount of rotation). The second sensor senses the same magnetic field from the opposite side of the magnet, so it sees a decreasing output. As the joystick 10 is rotated in the same clockwise direction the sensor's output would decrease from 50% of supply voltage to 49% to 48% and down to 0% of the supply voltage (depending on the settings applied to the sensor and the amount of rotation).

The two sensors 26 are both electronically connected to a microprocessor 28 that is mounted in the joystick 10. The microprocessor 28 compares the output from the (2) Hall effect sensors to assure that both signals are within a similar range. As long as this is found to be true, the joystick operates normally. If the processor 28 detects an inconsistency in its reading then the joystick 10 is put into a safe electrical state, that is the output from the joystick locked at electrical neutral.

The onboard microprocessor 28 can also be programmed to intelligently determine if a failure requires the joystick 10 to shut completely down, or if operation of the joystick 10 can reasonably continue. The software algorithm can check and compare if the (2) Hall effect sensors are within a normal operating range. If one sensor (sensor A in this case) is in a normal range and the other (sensor B) is outside its range it is possible for the joystick to operate based on the inputs from sensor A. The microprocessor 28 could then send out a valid signal and a warning or error to indicate that the signal has not been verified.

The algorithm described below processes the information from the redundant sensors 26. The signal from the sensor 26 must have opposite slopes. When the Primary sensor signal goes from high to low the Secondary sensor signal goes from low to high. The algorithm described below will apply to both the X and Y axis.

When the joystick 10 is operating: the algorithm will add the input from both of the redundant sensors 26, which should give close to a constant Sum. The Sum is compared with a given value to check if the Sum is within a valid area. A certain deviation of the sum is allowed. If the Sum drops out of valid limits then a signal is sent on the CAN bus within the normal message, also a DM1 message is sent.

During calibration: a description of how the calibration routine will calculate the sum and the limits of the sum follows below:

| # | Action (operator) | Do (internal joystick) | Example (values taken from Chart 1) | Remark |
|---|---|---|---|---|
| 1 | Move lever to full right | Measure Primary and secondary sensor and store in EEPROM. Calculate sum. | Primary = 4 Sec = 1 Sum = 5 | Measured at point 2 and 3 |
| 2 | Move lever to full left | Measure Primary and secondary sensor and store in EEPROM. Calculate sum. | Primary = 1 Sec = 4 Sum = 5 | Measured at point 1 and 4 |
| 3 | | Calculate the limits of which the sum must be within. | Valid area of Sum is = Sum+− x, x V | +− x, x V = Use values from earlier experience. The limits (+−) must be large enough to avoid generating faults due to non linearity of the sensor output. |

Where the sensors signals are off the normal values: in the Chart 2 it is assumed that the input values from the hall sensors are as follows:

| Primary sensor Max | min | Secondary sensor Max | Min | Resulting sum span |
|---|---|---|---|---|
| 4, 5 | 0, 5 | 3, 5 | 1, 5 | Max span |

The limits must be set in a way that the algorithm does not generate "unwanted" errors, e.g., the non linearity of the sensors must be included in the limits. These limits must be set widely in the beginning and then slowly minimized, as experience is obtained.

If the hall sensors 26 are very non-linear, then the calibration routine, for the redundant sensor algorithm, must be extended to include more calibration points than only the end-points.

Figure 7:
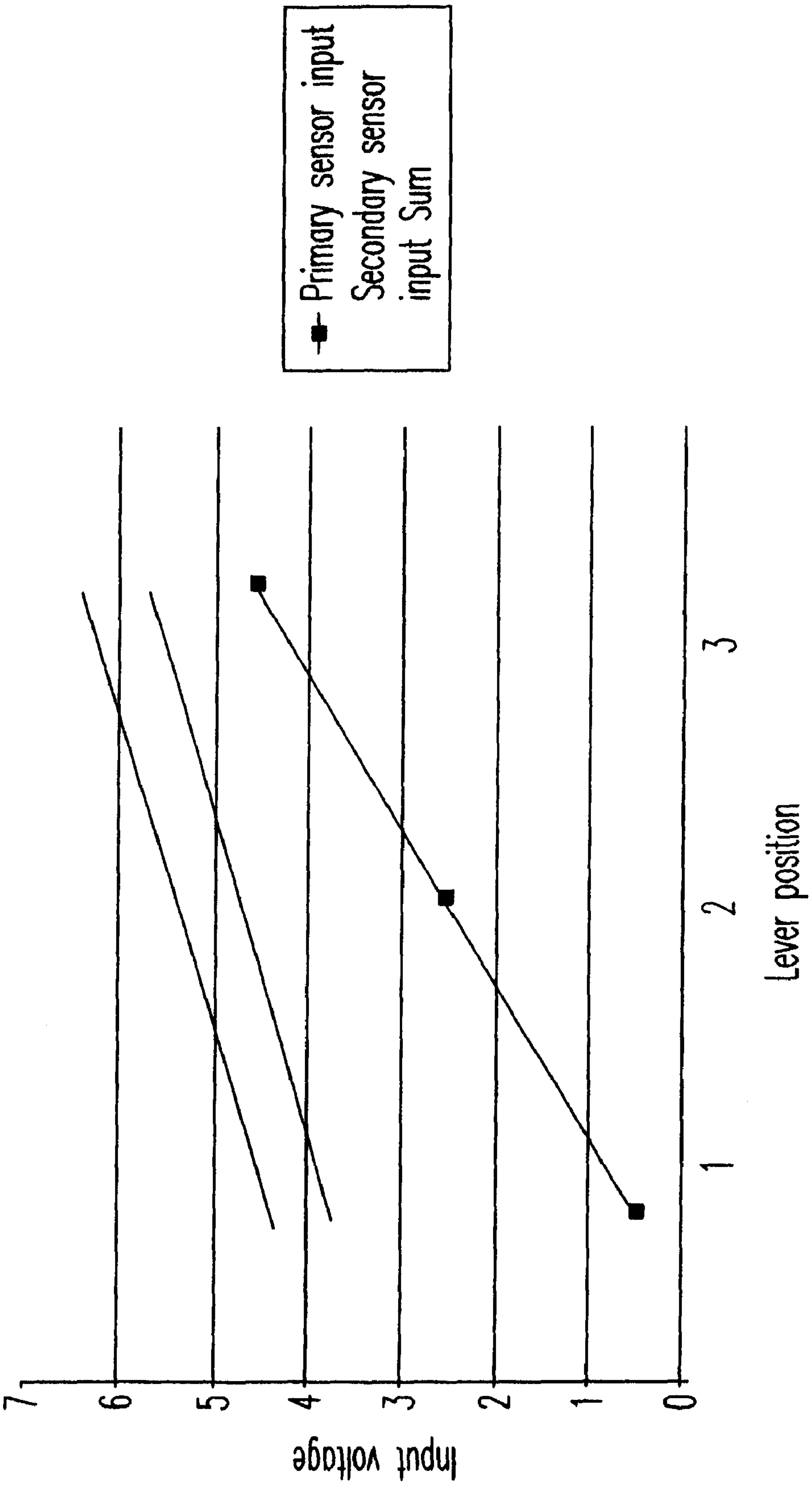
FIG. 7 is a graph of input voltage v. lever position.

FIG. 7 shows an example where the neutral position value has an offset and the limits of the Sum is not based on the neutral position. This will lead to "unwanted" error. If the non-linearity is known then the limits can be set accordingly. If the non-linearity is not known, as mentioned above, the algorithm must take the neutral position into the calculation of the Sum limits.

In operation, the joystick device 10 is mounted within reach of an operator and is used to control the movement of heavy machinery and the like. The operator grasps the joystick device 10 and affects the movement of the heavy machinery depending upon the operator's inputs. As desired, the operator triggers one or more of the input buttons 16 and 17, which send data signals to the grip microprocessor 18. The grip microprocessor 18 transfers the signals from the input buttons 16 as a single serial communication stream to the base microprocessor 28 via the interconnect device 20. Also as desired, the operator pivots the grip assembly 12 with respect to the base assembly 14, thereby triggering output signals from the sensing elements 26. The base microprocessor 28 receives the signals from the sensing elements 26 as well as the serial communication stream from the grip microprocessor 18 via the interconnect device 20 for processing an output signal based on the criteria previously described. The base microprocessor 28 transmits a single serial communication stream to the remotely located main controller via the external interconnect device 30 and associated cables. Based upon the operator's manipulation of the joystick device 10, the main controller controls and drives control actuators (not shown) and other devices that control the heavy machinery.

It should be noted that the joystick device 10 may be operated without the grip microprocessor 18. In this arrangement, the input buttons 16 are connected directly to the base microprocessor 28, which receives inputs from the input buttons 16 and sensing elements 26 and transmits a single serial communication stream to the remotely located main controller, which drives control actuators (not shown) and other devices that control the heavy machinery.

Additionally, the base microprocessor 28 may directly drive the control actuators (not shown) and other devices that control the heavy machinery. In this arrangement, the base microprocessor 28 transmits an output signal directly to the control actuators and other devices that control the heavy machinery.

Thus, it can be seen that the present invention provides a joystick device that uses redundant sensors and an onboard microprocessor to determine if a failure of the device has occurred. Additionally, the present invention provides a joystick device that has the ability to safely discontinue the joystick's function. Finally, the present invention provides a joystick device that has the ability to continue to operate the joystick and send out an error message to indicate that the signal is no longer verifiable.

What is claimed is:

1. A joystick device, comprising:

a grip assembly pivotably connected to a base assembly;

sensing elements disposed within the base assembly that detect position of the grip assembly as it pivots about the base assembly;

said sensing elements disposed about a given axis, such that one sensing element gives an increasing output and another sensing element gives a decreasing output; and a microprocessor disposed within the base assembly, wherein the microprocessor verifies an output signal from each of the sensing elements before transmitting each output signal.

2. The device of claim 1 wherein a second microprocessor is disposed within the grip assembly and is connected to the base microprocessor.

3. The device of claim 1 wherein when the microprocessor detects an inconsistency in one of the outputs the joystick is locked at electrical neutral.

4. The device of claim 1 wherein the microprocessor sends an output signal that shuts down the joystick when a failure is detected.

5. The device of claim 1 wherein the microprocessor sends a valid output signal and a warning signal.

6. The device of claim 1 wherein the microprocessor sends a neutral position value when the microprocessor detects a fault condition in any non-neutral position.

7. The device of claim 1 wherein the microprocessor sends a position value for a first sensing element and a warning signal if a fault condition is detected.

8. A joystick device, comprising:

a grip assembly pivotably connected to a base assembly;

sensing elements disposed within the base assembly that detect position of the grip assembly as it pivots about the base assembly;

said sensing elements disposed about a given axis, such that one sensing element gives an increasing output and another sensing element gives a decreasing output; and a microprocessor disposed within the base assembly wherein the microprocessor verifies an output signal from each of the sensing elements before transmitting each output signal; and wherein the microprocessor compares the output signals from the sensing elements by summing them together and comparing the sum against a predetermined given value to check if the sum is within a valid range.

9. The device of claim 8 wherein a deviation of the sum is allowed in the valid range.

10. The device of claim 9 wherein a fault message is sent if the sum drops out of the valid range.

11. A joystick device, comprising:

a grip assembly pivotably connected to a base assembly;

sensing elements disposed within the base assembly that detect position of the grip assembly as it pivots about the base assembly;

said sensing elements disposed about a given axis, such that one sensing element gives an increasing output and another sensing element gives a decreasing output; and a microprocessor disposed within the base assembly wherein the microprocessor verifies an output signal from each of the sensing elements before transmitting each output signal wherein the microprocessor compares the output signals from the sensing elements by summing them together from one end point to a mid-point and from an other end point to the mid-point, and compares the sums against a pre-determined constant value.

12. The device of claim 11 wherein if one of the sums falls outside of a valid range the sum is considered to be a fault condition.

* * * * *